(12) United States Patent
Wagner et al.

(10) Patent No.: US 8,091,468 B2
(45) Date of Patent: Jan. 10, 2012

(54) FLUID POWER LINEAR DRIVE DEVICE

(75) Inventors: Thomas Wagner, Winnenden (DE); Rolf Weberruss, Kernen (DE)

(73) Assignee: Festo AG & Co. KG, Esslingen (DE)

( * ) Notice: Subject to any disclaimer, the term of this patent is extended or adjusted under 35 U.S.C. 154(b) by 730 days.

(21) Appl. No.: 12/297,795

(22) PCT Filed: Mar. 8, 2007

(86) PCT No.: PCT/EP2007/001981
§ 371 (c)(1),
(2), (4) Date: Oct. 20, 2008

(87) PCT Pub. No.: WO2007/121808
PCT Pub. Date: Nov. 1, 2007

(65) Prior Publication Data
US 2009/0173221 A1    Jul. 9, 2009

(30) Foreign Application Priority Data

Apr. 21, 2006   (DE) .................... 20 2006 006 447 U (51) Int. Cl.
*F15B 15/08*    (2006.01)
*F16C 29/02*    (2006.01)

(52) U.S. Cl. ......................................... 92/88; 92/165 R
(58) Field of Classification Search ................ 92/51, 88, 92/165 R; 91/275
See application file for complete search history.

(56) References Cited

U.S. PATENT DOCUMENTS

| | | | | |
|---|---|---|---|---|
| 4,656,881 A * | 4/1987 | Goedecke et al. | ............. | 384/55 |
| 4,664,020 A * | 5/1987 | Kaiser | ............................... | 92/88 |
| 5,275,088 A * | 1/1994 | Takada et al. | ..................... | 92/88 |
| 5,277,498 A * | 1/1994 | Kawaguchi | ..................... | 384/45 |
| 6,308,614 B1 * | 10/2001 | Noda | ................................ | 92/88 |
| 6,336,393 B1 | 1/2002 | LeMire et al. | | |
| 6,460,466 B1 * | 10/2002 | Stoll et al. | ..................... | 104/281 |
| 7,520,191 B2 * | 4/2009 | Nagai et al. | ............... | 92/165 PR |

FOREIGN PATENT DOCUMENTS

| | | |
|---|---|---|
| DE | 3124878 C1 | 12/1982 |
| DE | 34367977 A1 | 4/1986 |

(Continued)

*Primary Examiner* — Thomas E Lazo
(74) *Attorney, Agent, or Firm* — Hoffmann & Baron, LLP (57) ABSTRACT

A fluid power linear drive device comprises a housing tube on whose outer periphery an output drive slide can slide linearly. For this purpose on the outer periphery of the housing tube there are two guide face pairs each having two guide faces extending along the housing tube on the outer periphery of the housing and, in the axial is direction of a first transverse axis of the housing tube, opposite each other, which in the direction of a second transverse axis, perpendicular to the first transverse axis, are spaced apart. The guide faces, as considered in a cross section of the housing tube, are slanted in each case in relation to the first and second transverse axis, first bearing elements arranged on the output drive slide are engaging the guide faces of the one, first guide face pair, such first bearing elements being able to pivot in relation to a pivot axis extending in the longitudinal direction of the housing tube independently of each other in relation to the output drive slide, and the guide faces of the other, second guide face pair are engaged by second bearing elements arranged of the output drive slide, the transverse position of the second bearing elements assumed in the axial direction of the first transverse axis in relation to the output drive slide being able to be varied.

25 Claims, 5 Drawing Sheets

FOREIGN PATENT DOCUMENTS

| | | | |
|---|---|---|---|
| DE | 19710790 A1 | 10/1998 | |
| DE | 10143878 B4 | 7/2004 | |
| EP | 0135041 A1 | 3/1985 | |
| EP | 0 603 471 B1 | 3/1996 | |

\* cited by examiner

FLUID POWER LINEAR DRIVE DEVICE

CROSS-REFERENCE TO RELATED APPLICATION

This application is a National Phase application of PCT/EP2007/001981 filed on Mar. 8, 2007, which claims priority to German Patent Application No. 20 2006 006 447.8 filed on Apr. 21, 2006, both of which are incorporated herein by reference.

BACKGROUND OF THE INVENTION

1. Field of the Invention

The invention relates to a fluid power linear drive device comprising a housing tube in which a drive piston is accommodated in a linearly slidable manner, said drive piston being kinematically coupled with an output drive slide adapted to run on the outer periphery of the housing tube in the longitudinal direction thereof, there being on the outer periphery of the housing tube, for movably bearing the output drive slide, two guide face pairs each having two guide faces extending along the housing tube and being arranged opposite each other in the axial direction of a first transverse axis of the housing tube, said two guide face pairs being spaced apart in the axial direction of a second transverse axis which is perpendicular to the first transverse axis.

2. Brief Description of the Related Art

In the case of a linear drive device of this type as disclosed in the European patent publication EP 0 603 471 B1 the drive piston is drivingly connected in a contact-free fashion by means of a permanent magnet coupling means with the output drive slide. The housing tube has an elongated cross section, the magnetic forces produced by the coupling means being mostly effective at a right angle to the longitudinal axis of the housing tube's cross section. The transitional regions between the narrow sides and the wide sides of the housing tube are designed in the form of guide faces, on which the output drive part slides.

In the case of an uneven distribution of the magnetic coupling forces the contact portion between the output drive part and the housing tube may entail undesired wear. In order to avoid this to a maximum extent highly accurate manufacture and fitting of the individual components is required with close tolerances. This results in there being relatively high costs of manufacture.

The German patent publication DE 34 36 977 C2 discloses a linear drive whose housing tube is provided with axially extending slanting guide rails on its output periphery for a slide to run on using suitable rolling parts.

The German patent publication DE 101 43 878 B4 discloses a linear setting member with a slide rider, which is coupled by magnetic forces with a piston able to be driven by a fluid.

SUMMARY OF THE INVENTION

One aim of the present invention is to propose measures in conjunction with a linear drive device of the type initially mentioned which render possible low-wear operation with a reduced degree of complexity.

In order to achieve this object there is a provision such that the guide faces, as considered in a cross section of the housing tube, are slanted in each case in relation to the first and the second transverse axis, that first bearing elements arranged on the output drive slide are engaging the guide faces of the one, first guide face pair, such first bearing elements being able to pivot independently of each other relative to the output drive slide in relation to a pivot axis extending in the longitudinal direction of the housing tube, and that the guide faces of the other, second guide face pair are engaged by second bearing elements arranged on the output drive slide, the transverse position of the second bearing elements assumed in relation to the output drive slide in the axial direction of the first transverse axis being able to be set variably.

It is in this manner that the angular position assumed by the housing tube in relation to the longitudinal axis between the housing tube and the output drive part may be variably set. A resetting of the second bearing elements leads to a change in the angular setting of the output drive slide in relation to the housing tube, the first bearing elements, owing to their pivotal bearing arrangement on the output drive slide, being able to keep up with the alteration in the angular position of its own accord. Accordingly, irrespectively of the setting made, there is a reliable and stress-free contact between the bearing elements and the guide faces. Therefore friction may be reduced to a minimum, something which means a long service life.

A pressure medium cylinder with a output drive slide is admittedly disclosed in the German patent publication DE 31 24 878 C1. The guide faces of the housing tube however in this case consist of wedge-like slots and adjustment takes place exclusively by linearly shifting the bearing elements fitting into the guide slots.

Advantageous developments of the invention are defined in the dependent claims.

To ensure a particularly even loading of the components in guide contact with each other the diverse guide faces have an identical slant angle as each other in relation to the two transverse axes. For the guide faces a slant angle of respectively 45 degrees is preferred. Departing from this however other angles are also possible.

Particularly simple production of the guide faces is ensured if the faces are flat.

In principle the output drive slide can be so designed that it only partially surrounds the housing tube. However the configuration in accordance with the invention is particularly advantageous in connection with a sleeve-like output drive slide for example, which completely surrounds the housing tube. The annular or frame-like structure of the output drive slide in cross section in this case too results in a particularly high degree of stiffness and accordingly a reliable supporting action for the bearing elements without the danger of yielding.

The drive piston could in principle be mechanically coupled with the output drive slide, for example by means of a rider extending through a longitudinal slot in the housing tube as is already proposed in the above mentioned German patent publication DE 31 24 878 C1 as an example. In the case of such a purely mechanical coupling the necessity of fine adjustments in angle is however not so pressing as in the case of configurations in which there is a contact-free kinematic coupling based on magnetic force between the drive piston unit and the output drive slide. To this extent a development of the invention is to be considered particularly advantageous in which the drive piston and the output drive slide are coupled together in a contact-free fashion using a permanent magnet coupling means, In the case of a linear drive device having a permanent magnet coupling means owing to the tolerance-related different sizes and/or different magnetization uneven distribution of magnetic forces along the periphery of the housing tube may be an issue. This set of problems is particularly relevant in the case of structural configurations, in which the permanent magnet coupling means is so contrived that coupling forces emanating from it are essentially effective in a single transverse direction of the housing tube. In this case pressing forces of different intensity may occur in accordance with differences in the pressing forces, which in the case of some guide faces may result in there being a higher wear rate. However with the possible adjustment in the invention there is the possibility of varying the distances between the outer magnet means arranged on the output drive slide and the inner magnet means arranged on the drive piston so that by an alteration in the size of the air gap an effect can be produced on the strength of the locally acting magnetic field. Accordingly the overall arrangement can be optimally balanced in such a fashion that there is an even loading and accordingly no excessive local wear.

In the case of a particularly advantageous embodiment of the invention the housing tube and preferably its internal space as well, has an elongated cross section. If such a linear drive device is fitted with a permanent magnet coupling means, the outer magnet means will preferably be at the wide sides of the housing tube. At the narrow sides no magnet means is required.

The two pairs of guide faces are in the case of such a design of housing tube preferably so arranged that one of the two pairs of guide faces are arranged near each of the two narrow sides of the housing tube. The active adjustable second bearing elements may in this case act, near or at one of the narrow sides, in the axial direction of the cross section's transverse axis of the housing tube on the associated guide faces. The pivotal first bearing elements are located on the opposite other narrow side.

Some or all of the bearing elements can be designed in the form of rolling elements. Preferably however a design in the form of sliding elements is preferred, as for example elements of a wear-resistant plastic material.

In order to ensure a particularly low surface pressure and accordingly an extremely free running properties of the output drive slide the bearing elements can be designed like rails and be in contact with the associated guide faces over a relatively long length.

The pivotal bearing support for the first bearing elements is more particularly one using suitable circularly arcuate guide means. This renders possible a structure without conventional bearing pins. On the output drive slide and on the first bearing elements it is possible in this case for mutually complementary, pivotal bearing faces to be present which are vaulted in a circularly arcuate manner. In this respect it is preferred to provide a convex pivotal bearing face arranged on the output drive slide to cooperate with a concave pivotal bearing face on the associated bearing element. The arrangement may however be a reversed one.

The angular adjustment of the output drive slide is facilitated since the second bearing elements may be set independently of each other.

In the case of a preferred design the second bearing elements slide in the direction of the first transverse axis on the output drive slide and are biased against the guide faces by loading means bearing against the output drive slide. Since the loading means are arranged in an adjustable fashion on the output drive slide, adjustment may be quite readily effected. The loading means are more especially screws and preferably of grub screws completely sunk into the output drive slide.

In the following the invention will be explained in detail with reference to the accompanying drawings.

DETAILED DESCRIPTION OF THE EMBODIMENTS

The linear drive device generally referenced 1 is designed for operation with fluid force, operation with a liquid or with a gaseous pressure medium being possible. Preferably compressed air is employed as an operating fluid.

The linear drive device 1 possesses a housing 2 with a tubular housing part termed the housing tube 3 and having a linear extent. At its two terminal sides the housing tube 3 is shut off by cover plates 4 and 5 for sealing.

In its interior the housing tube 3 defines an internal space 6 extending between the two cover plates 4 and 5. In it a drive piston 7 is placed sliding linearly in the direction of the longitudinal axis of the housing tube 3.

The drive piston 7 divides up the tube's internal space into two working chambers 12 and 13 placed in axial sequence in a sealing manner. Each working chamber 12 and 13 communicates with its own control duct 14 and 15 via which a controlled fluid action is possible in order to cause the drive piston 7 to perform a drive movement 16, indicated by a double arrow, in the direction of the longitudinal axis 8. Preferably the control ducts 14 and 15 extend in the two cover plates 4 and 5.

On the outer periphery of the housing tube 3 an output drive slide 17 is arranged. The latter more especially completely surrounds the housing tube 3, it having a frame-like structure as considered in cross section (see FIGS. 5 and 6). Accordingly it has the configuration of a sleeve, the term "sleeve" having to be understood in a general sense without limitation to a particular type of inner bore or outline. In the working embodiment the output drive slide 17 is externally essentially square in shape with four outer side faces 18 at a right angle to one another.

At least one assembly interface 22 is arranged on the output drive slide 17 for attachment of a component to be moved, for example a part of a machine. The assembly interface 22 may be provided with attachment means, for example screw threaded holes. In the working embodiment at least one of the outer faces 18 is provided with an assembly interface 22.

By way of a permanent magnet coupling means the drive piston 7 and the output drive slide 17 are kinematically coupled together in a contact-free manner through the wall of is the housing tube 3 for movement in the direction of the drive motion 16. This direction will in the following be referred to as the axial direction.

Owing to the magnetic coupling the drive piston 7 and the output drive slide 17 constitute a ganged unit. The output drive movement 16 of the output drive slide 7 is converted without any time lag into a synchronous output drive movement 24 of the output drive slide 17 in the same direction.

As an alternative to the contact-free kinematic it is also possible to provide a mechanical coupling. For example a mechanical connection using gear belts or using an entraining means extending through a longitudinal slot in the housing tube 3 would be possible.

The output drive slide 17 may also be so designed that it does not fully surround the housing tube 3 in the peripheral direction thereof. It could then for example surround the housing tube 3 like a clamp or a rider along part of the periphery.

Compact dimensions in conjunction with high possible drive forces are to be expected with a configuration of the housing tube 3 with a elongated guide face cross section form. This applies for the working example. Furthermore the cross section of the inner space 6 in the tube is preferably made elongated.

The housing tube 3 with an elongated cross section has a longitudinal axis 25 of the cross section and a transverse axis 26 of the cross section (see FIG. 5) perpendicular to it. The cross section's longitudinal axis 25 extends through the two mutually opposite wall portions 27 on the narrow sides and the transverse axis 26 of the cross section extends through the mutually opposite wall portions 28 on the wide side 28 of the housing tube 3.

The cross section of the inner space 6 of the tube is preferably so designed that its outlines at the wide side wall portions 28 extend linearly and at the wall portions 27 on the is narrow side it is rounded off like a circular arc.

The outer shape of the cross section of the housing tube 3 is preferably octagonal. It is composed of long lateral faces 32 which are parallel to the longitudinal axis 25 of the cross section and formed by the two wall portions 28 constituted by the two wall portions 28 on the wide side, of two short side faces 32 (constituted by the wall portions 27 on the narrow side) normal to the faces 32 and finally of in all four oblique sides 34, of which each one is arranged in the one of the four transitional regions between the long and short side faces 32 and 33.

The oblique faces 34 constitute guide faces 35 serving for bearing the output drive slide 17 and respectively extend in a slanting manner both with reference to the longitudinal axis 25 of the cross section and also with reference to the transverse axis 26 of the cross section.

The above mentioned guide faces 35 are ganged together as regards function. The two guide faces 35 corresponding to the same narrow side of the housing tube 3 constitute a first and, respectively, a second pair 36 and 37 of guide faces, such two pairs 36 and 37 of guide faces being spaced apart and opposite to each other in the axial direction of a second transverse axis 39 coinciding with the longitudinal axis of the cross section. The guide faces 35 belonging to the respective same pair 36 or 37 of guide faces lie opposite to one another in the axial direction of a first transverse axis 38 coinciding with the transverse axis 26 of the cross section. The two transverse axes 38 and 39 are accordingly at a right angle to each other.

The guide faces are preferably respectively even and extend in each case axially continuously along the full length of the housing tube 3. They are directed away from the inner space 6 of the tube.

The slant as viewed in cross section of the guide faces 35 with respect to the first and the second transverse axis 38 and 39 is preferably identical in the case of all four guide faces 35.

Preferably each guide face 35 defines an angle of 45 degrees with each transverse axis 38 and 39. However slant angles different to this are also possible.

It is also possible to consider the outer cross sectional outline of the housing tube 5 in the working example as having a substantially rectangular cross section, which is made oblique in the four corner portions to form the guide faces 35.

On each guide face 35 of the first pair 36 of guide faces there is a first sliding bearing element 42 which is able to slide. A respective second bearing element 43 makes a sliding and guiding contact with a respective guide face 35 of the second pair 37 of guide faces. The bearing elements 42 and 43 are arranged on the output drive slide 17 and partake in its movements. They are preferably in the form of rail-like sliding elements, which extend along a major part of the overall length of the output drive slide 17 and accordingly engage the guide faces 35 at a relatively long contact face. As an alternative it would be possible to provide several axially consecutive bearing elements per guide face 35.

The first bearing elements 42 are characterized by a bearing arrangement able to pivot in relation to the output drive slide 17. The pivot axes parallel to the longitudinal axis 8 are indicated at 44 and the pivot axis radius at 45. The two first bearing elements 42 may be slanted independently of each other about their pivot axis 44 associated with them.

The second bearing elements 43 engaging the guide faces 35 of the second pair 37 of guide faces are able to slide in the axial direction of the first transverse axis 38 in relation to the output drive slide 17. Accordingly their transverse position assumed in relation to the output drive slide 17 in the axial direction of the first transverse axis may be varied.

Owing to a matched adjustment of the two second bearing elements 43 an angular setting of the output drive slide 17 in relation to the housing tube 3 is possible. Dependent on the setting direction of the second bearing elements 43 the output drive slide 17 is pivoted in its own peripheral range athwart the housing tube 3 in the one or the other direction. The pivot range 48 is in this case within the range of the opposite first pair 36 of guide faces. Owing to the possible pivoting of the first bearing elements 42 same will of their own accord adjust themselves to the altered angular position in relation to the output drive slide 17 without losing contact over the guide faces 35.

Figures 1, 2:
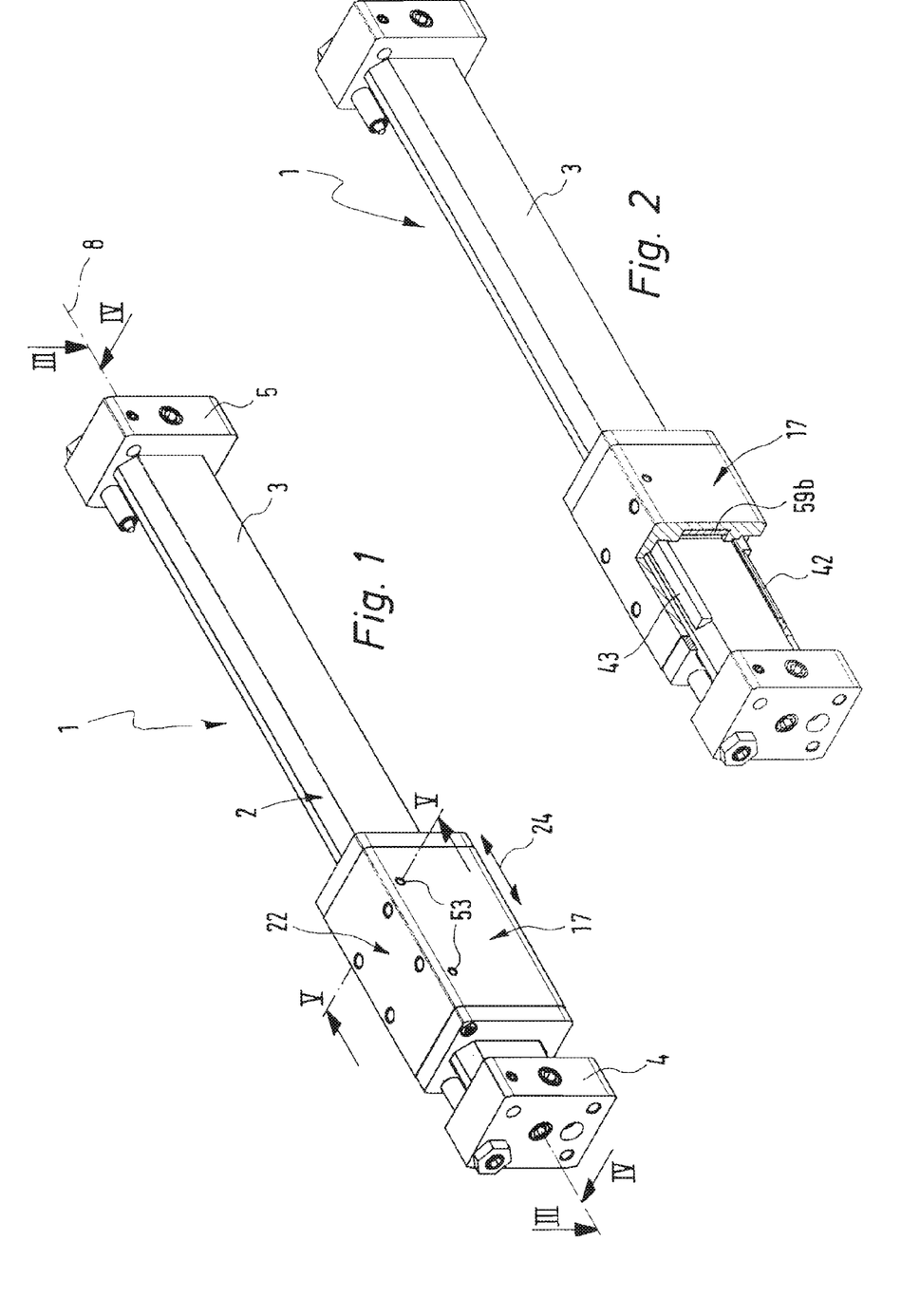
FIG. 1 shows a preferred design of the fluid power linear drive device in a perspective elevation.
FIG. 2 shows the arrangement of FIG. 1 with the linear drive device partly broken away so that one respective rail-like first and second bearing element are visible.
Figure 3:
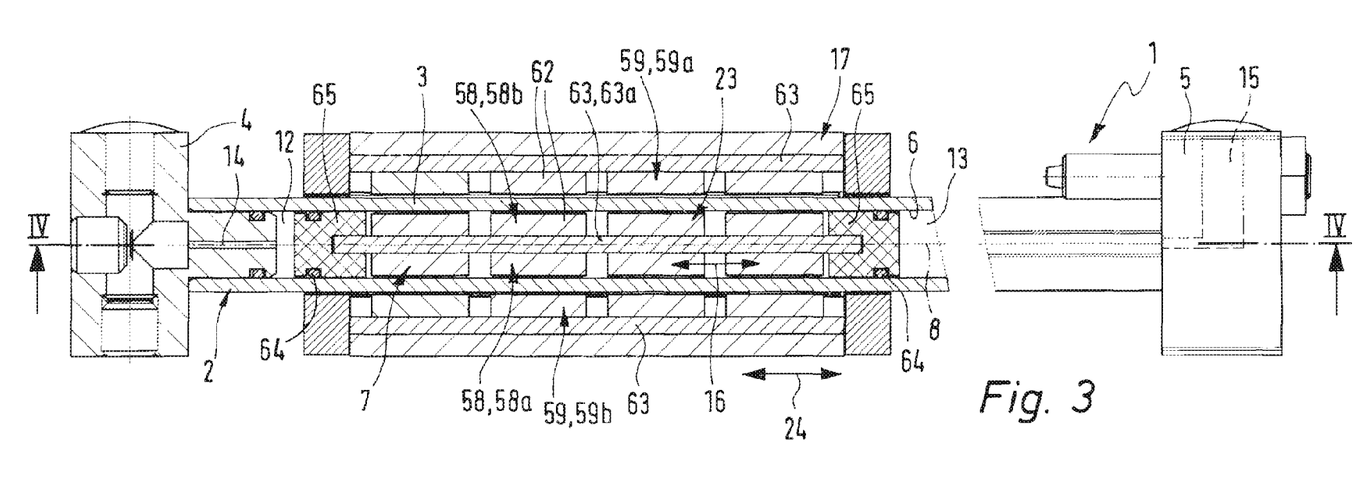
FIG. 3 is a longitudinal section through the linear drive device on the section line III-III in FIGS. 1 and 4.
Figure 4:
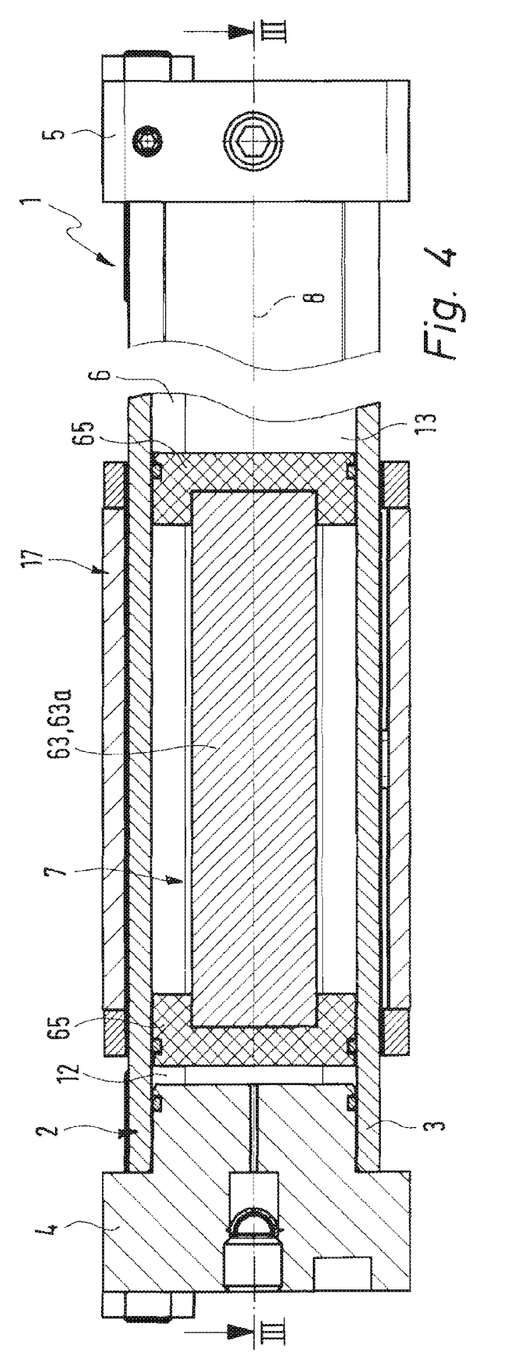
FIG. 4 shows the linear drive device in a sectional longitudinal view with a section line IV-IV turned through 90 degrees in relation to the section line as in FIG. 3.
Figure 5:
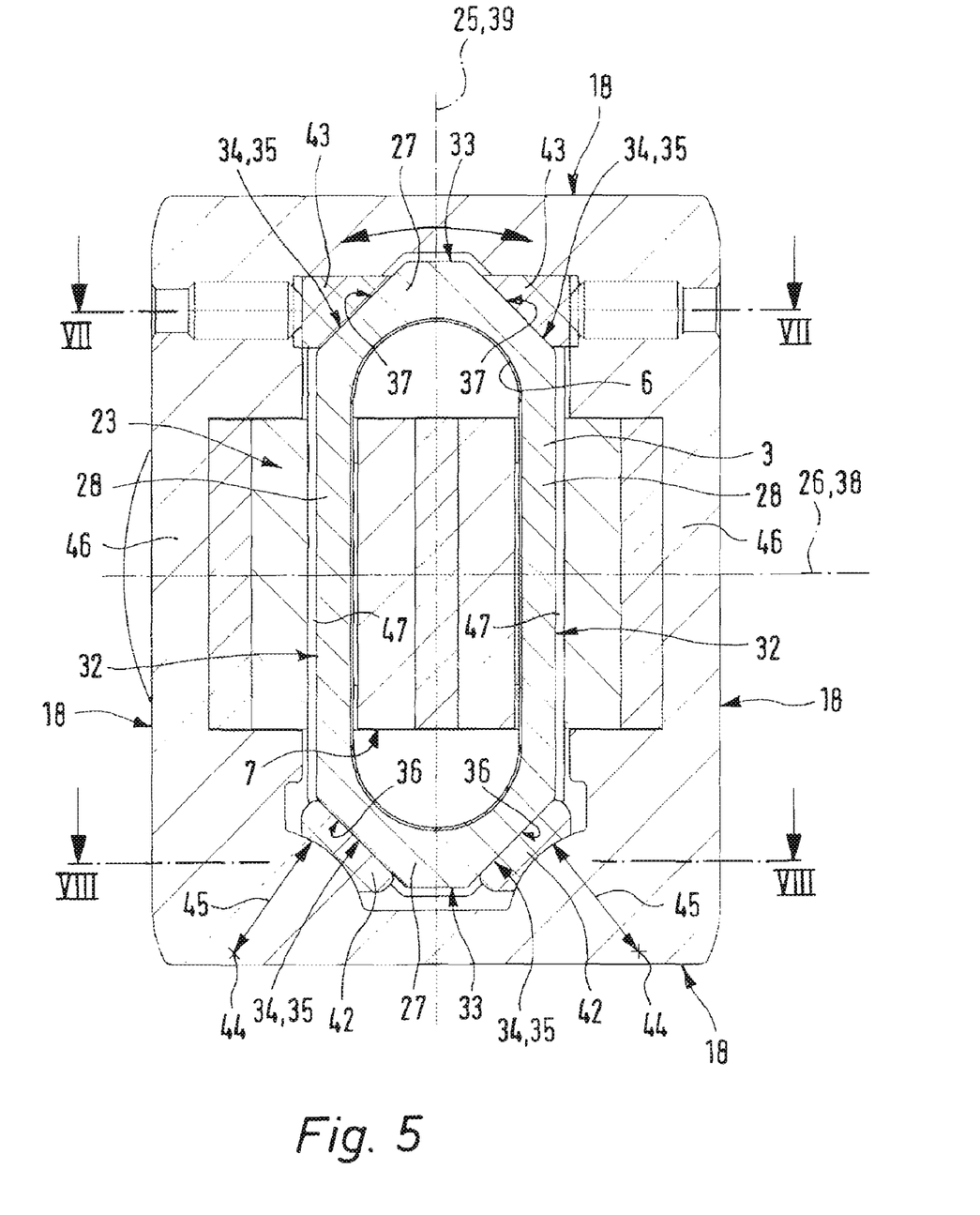
FIG. 5 represents a cross section taken through the linear drive device on the section line V-V of FIG. 1.
Figure 6:
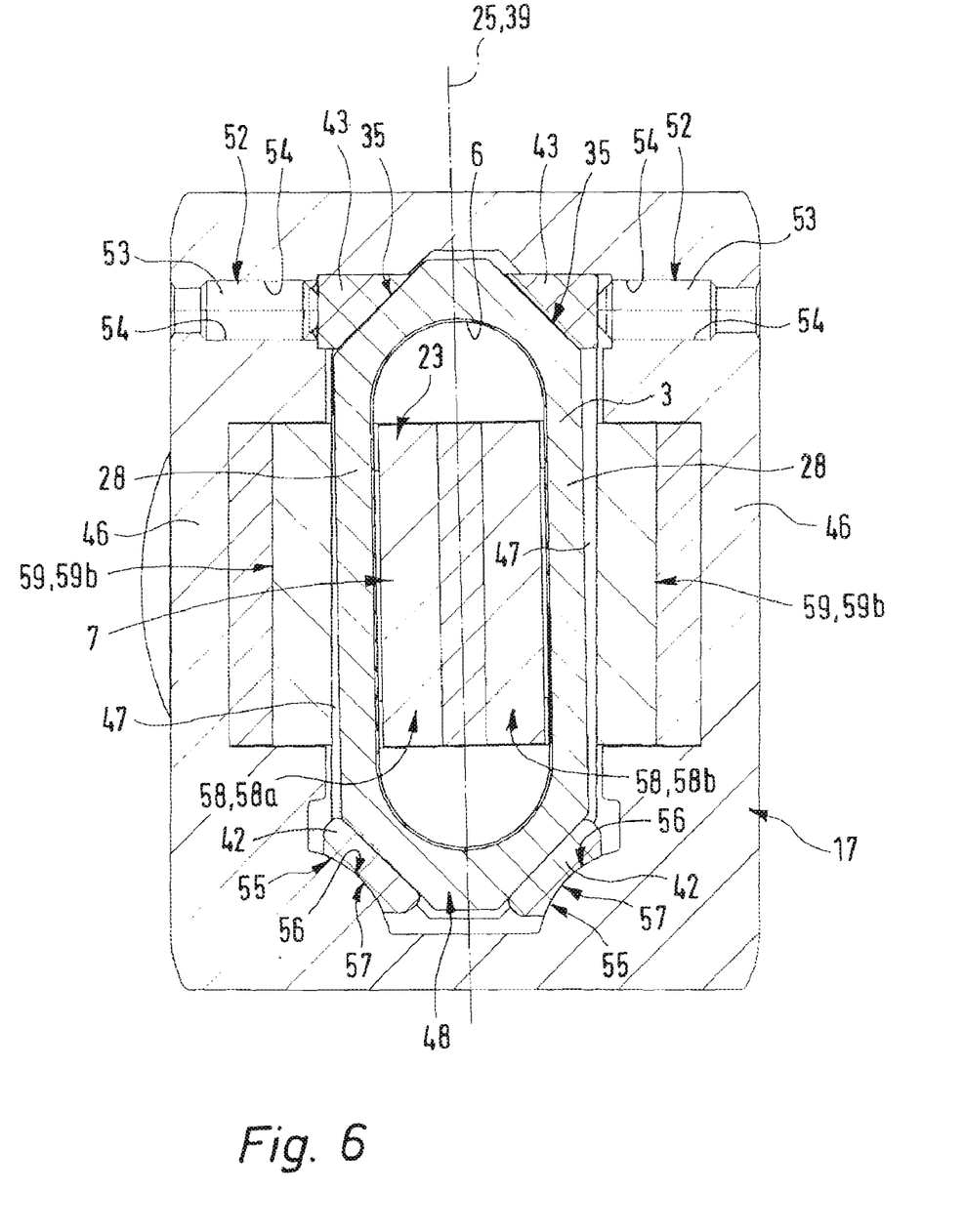
FIG. 6 shows the cross section of FIG. 5 with an altered angular orientation relative to the output drive slide and the housing tube.
Figure 7:
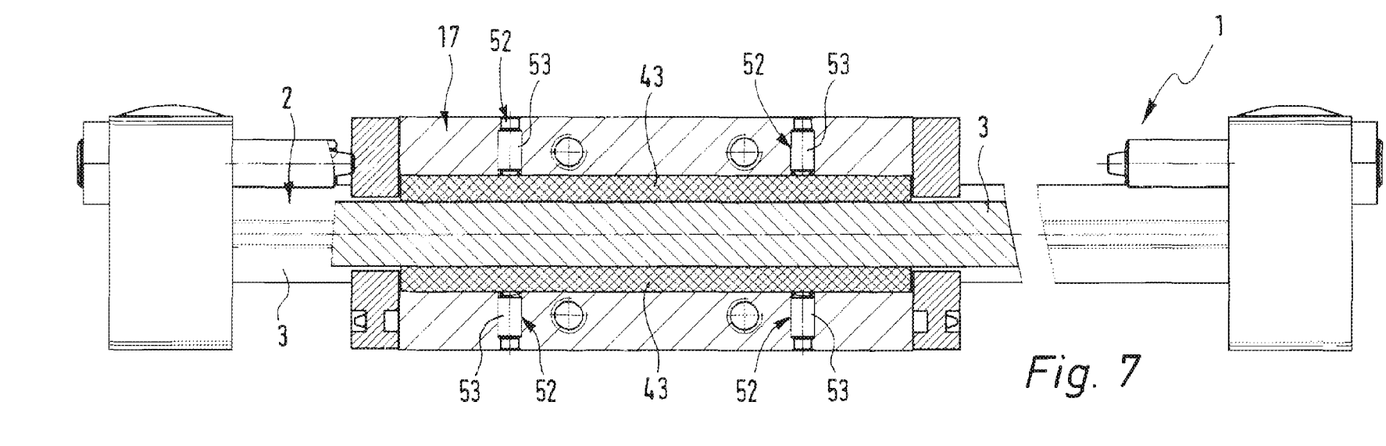
FIG. 7 is a longitudinal section taken through the linear drive device on the section line VII-VII of FIG. 5 in the vicinity of the second bearing elements.
Figure 8:
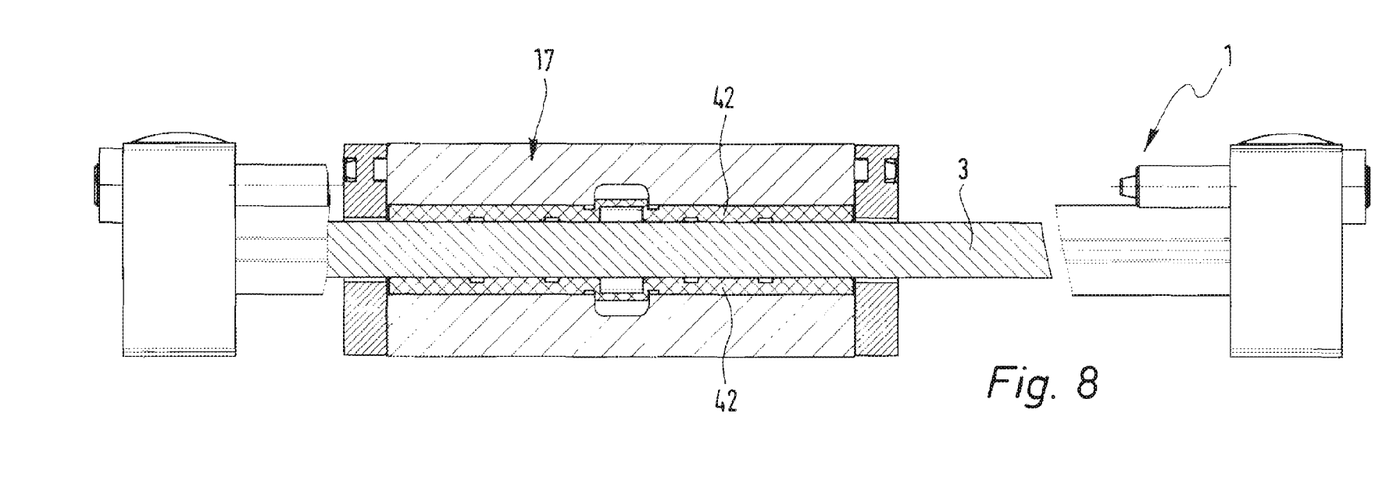
FIG. 8 is a longitudinal section through the linear drive device taken on the section line VIII-VIII of FIG. 5 in the vicinity of the first bearing elements.

For comparison the FIGS. 5 and 6 show differently set angular alignments between the output drive slide 17 and the housing tube 3. While in the case of the alignment of FIG. 5 there is in each case an air gap 47, with a constant width, between the two wall portions 28 on the wide side of the housing tube 3 and the rib portions 46 adjacent to them, in the case of the setting in FIG. 6 there is a wedge-like form of cross section of the air gaps 47 entailed by the pivoting, occurring through the range 48 parallel to the longitudinal axis 48 of the output drive slide 17.

Preferably the second bearing elements 43 are able to be adjusted independently of one another. For setting it is preferred as a rule to shift the two bearing elements 43 respectively simultaneously in the same direction. The output drive slide 17 will then turn in the opposite direction to that movement, in which the second bearing elements 43 are shifted.

For adjustment each second bearing element 43 has a loading means 52, which bear against the output drive slide 17 and can thrust in the direction of the associated guide faces 35 against the second bearing element 43 placed between them and the respective guide face 35.

It is preferred for the loading means 52 to comprise several loading screws 52 arranged along each respective is second bearing element 43, such screws being able to be screwed in the axial direction of the first transverse axis 38 in threaded holes 54 in the output drive slide 17. It is preferably a question of grub screws let into the output drive slide 17. By means of a screw driving tool, which is able to be applied to them, they may be selectively screwed in or unscrewed, the screws either acting on the proud second bearing element 43 or being drawn back by it. Owing to a sufficiently stiff screw connection, the arrangement ensures that the loading screws 53 remain locked in the set position of screwing so that an undesired loss of the setting on the second bearing elements 43 is avoided.

In lieu of having only a loose contact, as in the working example, the loading means 52 can also be so joined with the second means 43 that their action can be both a thrusting action and also a pulling action.

The pivot axis 44 is in the example only an imaginary axis about which the associated first bearing element 42. It is preferably defined by a circularly arcuate guide means 55, which despite its simple design has a high load carrying capacity.

The circularly arcuate guide means 55 also includes two mutually complementary circularly arcuate pivotal bearing faces, whose center of curvature lies on the desired pivot axis 44. One pivotal bearing face 56 is located on the output drive slide 17 and the other on the associated first bearing element 42. In the present example the pivotal bearing face 56 of the output drive slide 17 is a convex face, whereas the pivotal bearing face 57 of the first bearing element 42 is a concave face. A reverse arrangement is however also possible.

At the two pairs of pivotal bearing faces 56 and 57 the two first bearing elements 42 may respectively slide, while performing the pivotal movement, on the output drive slide 17 or vice versa.

As regards the bearing elements 42 and 43 they may also is be in the form of roller elements instead of slide elements, The permanent magnet coupling means 23 comprises an inner magnet means 58 arranged on the drive piston 7 and also an outer magnet means 59 arranged on the output drive slide 17. These means are preferably so designed that the magnetic coupling forces produced are predominantly effective in the axial direction of the first transverse axis 38.

In order to ensure this the outer magnet 59 comprises in the working embodiment two outer magnet units 59a and 59b placed diametrally opposite one another on opposite peripheral sides of the housing tube 3. Each of such outer magnet units 59a and 59b has one of two inner magnet units 58a and 58b radially opposite to it. The mutually adjacent outer and inner magnet units 59a, 59b, 58a and 58b cooperate with each other by magnetic attraction.

More particularly in the case of this arrangement it is not possible to ensure that the magnetic attraction forces effective between the mutually cooperating magnet units 58a and 58b and guide face also question 59a and 59b are quite different in strength. This may be because owing to manufacturing inaccuracies the magnet units have different dimensions or because there are different intensities of magnetization. The consequence of this may be a different pressing forces of individual bearing elements 42 and 34 against the associated guide faces 35 so that there is an increased wear rate. However owing to the possibility of adjustment in angle between the output drive slide 17 and the housing tube 3 there is the possibility of so varying the width of the air gap 47 that more especially the magnetic attraction forces acting in the direction of the first transverse axis 38 compensate each other and all four bearing elements 42 and 43 are drawn toward the guide faces 35 with substantially the same force. This creates a free running possibility of adjustment for the output drive slide 17 with a reduced liability to wear.

The individual magnet units 59a and 59b and also 58a and 58b comprise in the working example in each case several permanent magnet and preferably plate-like magnet elements 62 preferably arranged in pairs with each other. The magnet elements 62 of each magnet unit 59a, 59b. 58a and 58b are preferably arranged on a preferably plate-like ferromagnetic magnet shunt part 63 extending also in the direction of the longitudinal axis 8. The magnet elements 62 may be bonded in position.

The preferred structure, adopted in the working embodiment, of the drive piston 7 involves having two axially spaced apart piston heads 65, each provided with at least one seal ring 64 and arranged on the two terminal portions of a central magnetic shunt part 63 and 63a, which functions as a support for the magnet elements 62 of the two inner magnet units 58a and 58b. This preferred design of a drive piston 7 is furthermore advantageous if the above mentioned means for angular adjustment between the output drive slide 17 and the housing tube 3 are not present and to this extent there is a conventional design of the linear drive means.

What is claimed is:

1. A fluid power linear drive device comprising a housing tube in which a drive piston is accommodated in a linearly slidable manner, said drive piston being kinematically coupled with an output drive slide adapted to run on the outer periphery of the housing tube in the longitudinal direction thereof, there being on the outer periphery of the housing tube, for movably bearing the output drive slide, two guide face pairs each having two guide faces extending along the housing tube and being arranged opposite each other in the axial direction of a first transverse axis of the housing tube, said two guide face pairs being spaced apart in the axial direction of a second transverse axis which is perpendicular to the first transverse axis, the guide faces, as considered in a cross section of the housing tube, being slanted in each case in relation to the first and the second transverse axis, that first bearing elements arranged on the output drive slide are engaging the guide faces of the one, first guide face pair, such first bearing elements being able to pivot independently of each other relative to the output drive slide in relation to a pivot axis extending in the longitudinal direction of the housing tube, and that the guide faces of the other, second guide face pair are engaged by second bearing elements arranged on the output drive slide, the transverse position of the second bearing elements assumed in relation to the output drive slide in the axial direction of the first transverse axis being able to be set variably.

2. The linear drive device in accordance with claim 1, wherein the guide faces, as considered in a cross section of the housing tube, are directed among themselves with the same angles of slant in relation to the two transverse axes.

3. The linear drive device in accordance with claim 1, wherein the guide faces are planar faces.

4. The linear drive device in accordance with claim 1, wherein the output drive slide fully surrounds the housing tube.

5. The linear drive device in accordance with claim 1, wherein the drive piston and the output drive slide are kinematically coupled without making contact with one another by a permanent magnet coupling means effective through the wall of the housing tube.

6. The linear drive device in accordance with claim 5, wherein the permanent magnet coupling means comprises an inner magnet means arranged on the drive piston and an outer magnet means cooperating therewith, which is arranged on the output drive slide.

7. The linear drive device in accordance with claim 6, wherein the outer magnet means comprises two outer magnet units disposed on diametrally opposite peripheral sides of the housing tube.

8. The linear drive device in accordance with claim 7, wherein the inner magnet means comprises two mutually diametrally opposite inner magnet units respectively radially adjacent to one of the outer magnet units.

9. The linear drive device in accordance with claim 5, wherein the permanent magnetic coupling means is so designed that the magnetic coupling forces generated by it are substantially effective only in the axial direction of the first transverse axis.

10. The linear drive device in accordance with claim 5, wherein the housing tube has an elongated cross section and the permanent magnetic coupling means is configured so that the magnetic coupling forces generated by it are effective perpendicularly to a longitudinal axis of the cross section of the housing tube.

11. The linear drive device in accordance with claim 5, wherein the drive piston comprises two axially spaced apart piston heads, between which a plate-like ferromagnetic shunt part extends, which carries permanent magnet elements of the permanent magnet coupling means.

12. The linear drive device in accordance with claim 1, wherein the housing tube has an elongated cross section.

13. The linear drive device in accordance with claim 12, wherein the guide faces are arranged in the four transitional regions between the two narrow sides and the two wide sides of the housing tube which is elongated in cross section.

14. The linear drive device in accordance with claim 12, wherein the housing tube has a cross section with an essentially rectangular outline, which is made oblique in the four corner regions for forming the guide faces.

15. The linear drive device in accordance with claim 12, wherein the housing tube has a cross section with an octagonal outline, with long side faces at the wide sides and short side faces at the narrow sides, and with the guide faces extending in the transitional regions between the wide and narrow sides obliquely in relation to the long and the short side faces.

16. The linear drive device in accordance with claim 12, wherein the two guide face pairs are respectively associated with one of the two narrow sides of the housing tube.

17. The linear drive device in accordance with claim 12, wherein the second transverse axis coincides with the longitudinal axis of the cross section and the first transverse axis coincides with the transverse axis of the cross section of the elongated cross section of the housing tube.

18. The linear drive device in accordance with claim 1, wherein the bearing elements are in the form of plain bearing elements.

19. The linear drive device in accordance with claim 18, wherein the bearing elements are rail-like and extend in parallelism to the longitudinal axis of the housing tube.

20. The linear drive device in accordance with claim 1, wherein the pivotable first bearing elements are each movably supported on the output drive slide for pivoting using a circularly arcuate guide means.

21. The linear drive device in accordance with claim 20, wherein the circularly arcuate guide means comprises at least two mutually complementary circularly arcuate pivotal bearing faces, of which one is arranged on the output drive slide and the other is arranged on the associated first bearing element and which engage each other in a sliding manner in the pivoting direction.

22. The linear drive device in accordance with claim 21, wherein the pivotal bearing face disposed on the output drive slide is a convex face and the pivotal bearing face slidingly engaging same of the first bearing element is a complementary concave face, or vice versa.

23. The linear drive device in accordance with claim 1, wherein the second bearing elements cooperating with the two guide faces of the second guide face pair are able to be adjusted in the axial direction of the first transverse axis in relation to the output drive slide.

24. The linear drive device in accordance with claim 1, wherein the second bearing elements are arranged for sliding in the direction of the first transverse axis on the output drive slide and cooperate with loading means supporting themselves on the output drive slide in an adjustable fashion.

25. The linear drive device in accordance with claim 24, wherein the loading means comprise loading screws screwed into the output drive slide in an adjustable manner.

* * * * *